United States Patent
Lindqvist et al.

(10) Patent No.: US 8,050,005 B2
(45) Date of Patent: Nov. 1, 2011

(54) AUTOMATIC FUNCTION WITH SELECTABLE FUSE RATING FOR SINGLE FUSES AND FUSE PANELS

(75) Inventors: Dan Anders Lindqvist, Sollentuna (SE); Per Holmström, Upplands-Växby (SE); Anders N. Svensson, Sollentuna (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 667 days.

(21) Appl. No.: 11/950,445

(22) Filed: Dec. 5, 2007

(65) Prior Publication Data
US 2008/0150671 A1 Jun. 26, 2008

Related U.S. Application Data

(60) Provisional application No. 60/875,853, filed on Dec. 20, 2006.

(51) Int. Cl.
*H02H 3/08* (2006.01)
(52) U.S. Cl. ...... 361/93.7; 361/93.1; 361/101; 361/93.3
(58) Field of Classification Search .............. 361/93.7, 361/93.1, 100, 101, 93.2, 104; 337/161, 337/257, 258, 285; 338/77, 92
See application file for complete search history.

(56) References Cited

U.S. PATENT DOCUMENTS

| | | | | |
|---|---|---|---|---|
| 3,373,392 A * | 3/1968 | Loebe | ............................. | 338/77 |
| 3,489,980 A * | 1/1970 | Masters | ........................ | 338/308 |
| 5,191,279 A * | 3/1993 | Zommer | ........................ | 323/354 |
| 5,835,324 A * | 11/1998 | Hatton | ........................ | 361/93.2 |
| 6,307,490 B1 * | 10/2001 | Litfin et al. | ................... | 341/121 |
| 6,507,053 B1 * | 1/2003 | Bernard et al. | .............. | 257/209 |
| 6,639,776 B2 * | 10/2003 | Sudou et al. | ................. | 361/93.7 |
| 7,630,186 B2 * | 12/2009 | Reynolds et al. | ............ | 361/93.1 |
| 2001/0009493 A1 | 7/2001 | Sudou et al. | | |

FOREIGN PATENT DOCUMENTS

| | | | |
|---|---|---|---|
| DE | JP198723 A * | 2/1987 | |
| JP | 7-22216 * | 1/1995 | |
| JP | 2006351710 A * | 12/2006 | |
| WO | 0229954 A1 * | 4/2001 | |
| WO | 02/29954 A1 | 4/2002 | |

* cited by examiner

*Primary Examiner* — Patrick Salce
(74) *Attorney, Agent, or Firm* — Nixon & Vanderhye P.C.

(57) ABSTRACT

A programmable fuse and fuse panel are described. Unlike conventional fuses and fuse panels, the trip values of the fuses of the panel—i.e., the current values at which the fuse trips—are field programmable. One of many advantages includes the ability to adaptively set the trip value of a fuse—depending on the operating needs of a load device—without having to physically exchange the fuse. In an embodiment, electronic fuses are used.

29 Claims, 15 Drawing Sheets

Fig. 6A — Lowest Trip Value — Program Connector 120, 135, 135, 135, Coupled to Electronic Fuse, Power Fig. 6B — Program Connector 120, 135, 135, 135, Coupled to Electronic Fuse, Power Fig. 6C — Program Connector 120, 135, 135, 135, Coupled to Electronic Fuse, Power Fig. 6D — Highest Trip Value — Program Connector 120, 135, 135, 135, Coupled to Electronic Fuse, Power

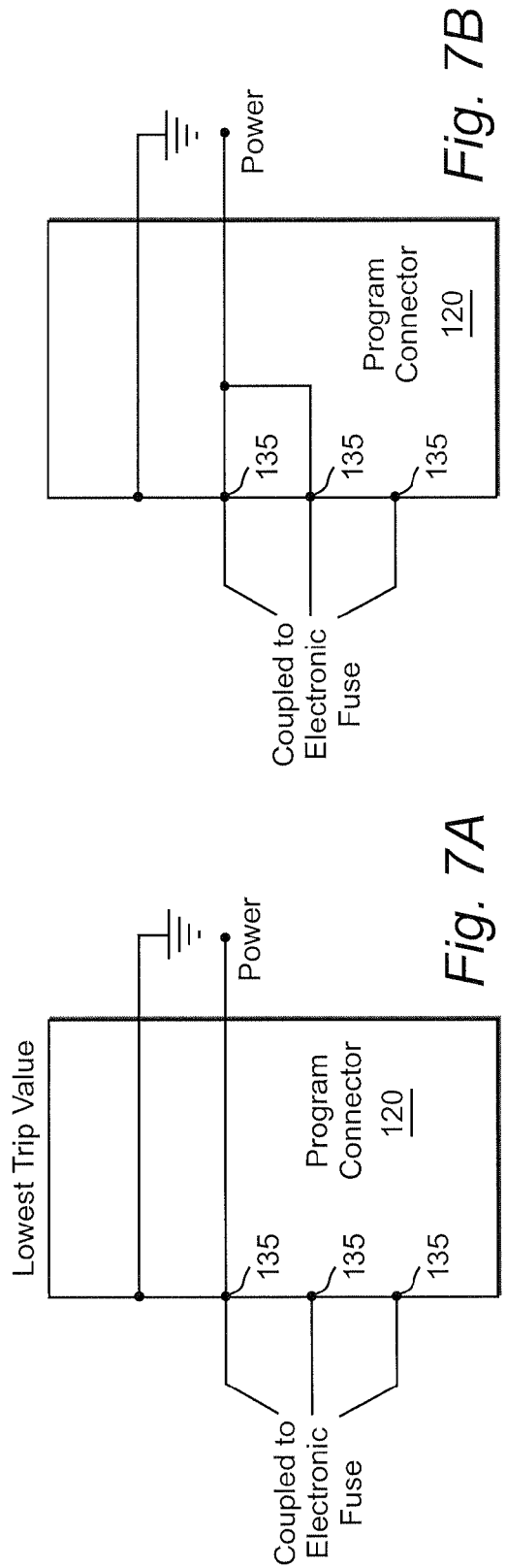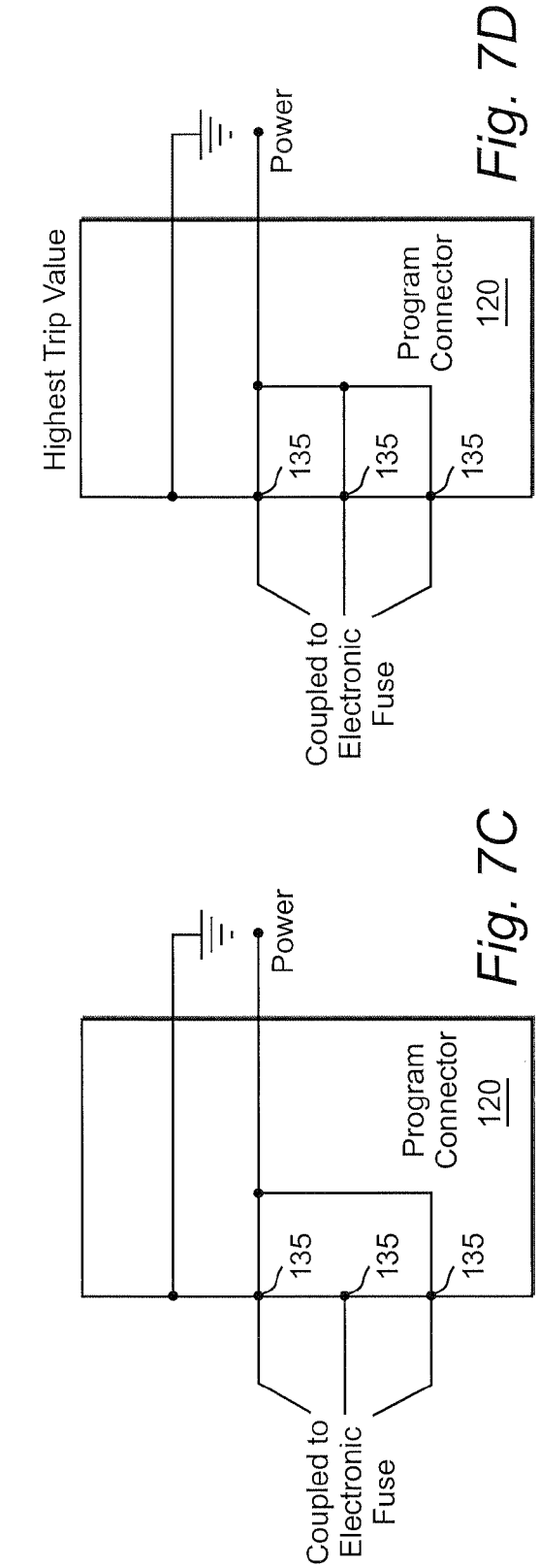

AUTOMATIC FUNCTION WITH SELECTABLE FUSE RATING FOR SINGLE FUSES AND FUSE PANELS

RELATED APPLICATION

This application claims priority to the provisional application 60/875,853 entitled "AUTOMATIC FUNCTION WITH SELECTABLE FUSE RATING FOR SINGLE FUSES AND FUSE PANELS" filed on Dec. 20, 2006, the content of which is hereby incorporated by reference in its entirety.

TECHNICAL FIELD

The technical field of this disclosure generally relates to providing fuse and fuse panels that are field programmable. Some embodiments of the field programmable fuses and fuse panels are based on electronic fuses.

BACKGROUND

In a typical power distribution system, such as for residential homes, a fuse panel with a number of fuses are used. The trip value of each fuse is selected to protect each load device connected to the fuse. When a new load device is to be connected to the panel, a free fuse with a proper trip value for the new load device is selected.

Fuse panels of today are based on a number of different technologies such as melting wire types, heat activated types and electronic types. No matter the type, the fuse "trips" or breaks the circuit to the load device when the current provided to the load device exceeds the trip value.

FIG. 12 illustrates a conventional fuse panel 1200 that includes a plurality of individual fuses 1210. In this particular example, there are six (6) fuses 1210 with differing trip values. The first two fuses have the trip values set at 2 amperes (or 2 A), the second 2 fuses have their trip value set at 5 A and the third set of fuses have their trip value set at 10 A. Each fuse provides power from an external power source 1240 to the respective load devices 1250.

The fuses 1210 can be electronic type fuses. FIG. 13 illustrates a conventional electronic fuse 1210. The conventional electronic fuse 1210 includes an electronic switch 1310 coupled to a shunt 1330 to deliver power from the external source connected at input 1212 (see also FIG. 12) to the load device connected at output 1214. The electronic fuse 1210 also includes a voltage comparator 1320 that measures a voltage drop across the shunt 1330. The voltage drop across the shunt 1330 is related to an amount of current flowing through the shunt 1330 to the load device 1250. If the voltage drop across the shunt 1330 is at or above a threshold level, the comparator 1320 outputs a signal to the electronic switch 1310 to turn off. By setting the threshold voltage, an appropriate trip value is set for the electronic fuse 1210.

A major disadvantage with the conventional fuse and fuse panels is that the trip value of each fuse must be determined during the production of the panel and remains fixed. For electronic fuses such as those illustrated in FIG. 13, threshold voltage is fixed during the production. This requires that each panel be tailored for a number of load devices at specific current values. This creates a problem when a new load device is desired to be added but there is no free fuse available with the correct trip values. Referring back to FIG. 12, it is seen that both 2 A fuses are already occupied. If another 2 A load device is desired to be connected, it will impossible with the conventional fuse panel. This is despite the fact that there are fuses with other trip values available such as the 5 A and 10 A fuses.

Conventionally, this problem can be addressed by rebuilding the panel or by adding a new panel altogether. Both of these solutions are inefficient and costly.

SUMMARY

In an example embodiment, a field programmable fuse includes an electronic fuse. The electronic fuse is configured to deliver a load current from an external source to a load device. The electronic fuse comprises one or more field selectable trip value inputs such that a trip value of the electronic fuse is set based on values applied to the selectable trip value inputs. When an amount of the load current delivered to the load device exceeds the trip value set for the electronic fuse, the electronic fuse is configured to cease delivering the load current to thereby protect the load device.

The electronic fuse can include a shunt, a comparator, and an electronic switch. The shunt or the comparator can be variable—i.e., field programmable. The shunt delivers the load current from an external source to the load device, the comparator measures a voltage drop across the shunt, and the electronic switch switches ON and OFF the delivery of the load current from the external source to the shunt. When the voltage drop across the shunt is above or substantially at a predetermined threshold, the voltage comparator outputs a TURN OFF signal to the electronic switch. Upon receipt of the TURN OFF signal from the voltage comparator, the electronic switch switches OFF the delivery of the load current.

In an embodiment, the shunt is a variable shunt that is configured to vary its impedance value based on the trip value set for the electronic fuse. In a variant of the embodiment, the programmable fuse includes a trip controller which controls the impedance value of the variable shunt based on inputs to the trip value inputs.

The variable shunt can include a plurality of shunt devices and a plurality of bypass gates. The plurality of bypass gates provide a capability to selectively bypass one or more of the shunt devices. The plurality of bypass gates are arranged to bypass different combinations of the plurality of shunt devices based on different trip value settings. The plurality of shunt devices can be arranged in series with each other, in parallel with each other, or in a combination of both.

In an embodiment, the comparator is a variable comparator 220 that is configured to measure a voltage drop across the shunt and to output the TURN OFF signal to the electronic switch 210 when the voltage drop across the shunt is above or substantially at a threshold voltage. In this embodiment, the threshold voltage is varied based on the trip value set for the electronic fuse. A trip value controller can be used to control the threshold voltage level.

The electronic fuse can also include a voltage divider, which can be variable—i.e., field programmable. The variable voltage divider outputs a divided voltage. The divided voltage output by the variable voltage divider is a portion of the voltage drop across the shunt. The portion of the voltage drop output as the divided voltage is based on the trip value set for the electronic fuse. A trip value controller can be used to control the portion of the voltage drop output as the divided voltage based on the trip value set for the electronic fuse.

The voltage divider can include a first impedance group and second impedance group in series with each other. The impedance group has a first impedance value and the second impedance group has a second impedance value. The voltage drop across the shunt is divided between the first and second impedance groups. Either the voltage drop over the first impedance group or the second impedance group is output as the divided voltage.

The comparator outputs the TURN OFF signal to the electronic switch 210 when the divided voltage is above or substantially at a predetermined threshold. Upon receipt of the TURN OFF signal from the voltage comparator, the electronic switch switches OFF the delivery of the load current. One or both of the first and second impedance groups can vary their impedance values based on the trip value set for the electronic fuse.

One or both impedance groups can include a plurality of impedance devices and a plurality of bypass gates to provide a capability to selectively bypass one or more of the plurality of impedance devices. The plurality of bypass gates are arranged to bypass different combinations of the plurality of impedance devices based on different trip value settings. The impedance devices can be connected in series, in parallel, or a combination of both.

In an embodiment, the field programmable fuse can include a programming connector. The programming director includes one or more programming pins coupled to the field selectable trip value inputs of the electronic fuse. Each programming pin is field settable—i.e., field programmable—to take on one of a plurality of electrical values. The trip value of the electronic fuse is determined by a combination of the electrical values set on the programming pins.

The electrical values can be any one of electrically open, ground, power, and one or more voltage values other than the ground and the power. The programming connector can include at least one impedance device coupled to a programming pin such that the electrical value of the coupled programming pin is set to be a voltage other than the ground and the power. The impedance devices can be connected to ground or to the power.

In an embodiment, the load device can be connected to the electronic fuse or via the programming connector.

In an embodiment, multiple programmable fuses can be arranged to form a fuse panel. The fuse panel can include a combination of programmable fuses and fixed fuses. The programmable fuses can be programmed simultaneously.

In an embodiment, the trip value inputs are physically spaced apart from each other and the load device can include a load select blade with differing physical sizes such that when inserted, one or more of the trip value inputs come into physical contact with the load select blade. The combination of the trip value inputs that come into contact with the load select blade determines the trip value of the electronic fuse. The load select blade can be integrated into a single physical piece with a load input of the load device or with the power output of the electronic fuse.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIGS. 6-9 illustrate example embodiments of programming connectors including programming pins that are set to various electrical values to set the trip value of the programmable fuse;

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope.

In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

Modifying the trip value—a value of current at which a fuse trips—for an electronic fuse may be done in several ways. These include bypassing parts of the shunt and bypassing parts of the signal that is connected to the comparator. Another way is to use programming pins as inputs to a programming controller to modify the trip value of the electronic fuse.

Figure 1A:
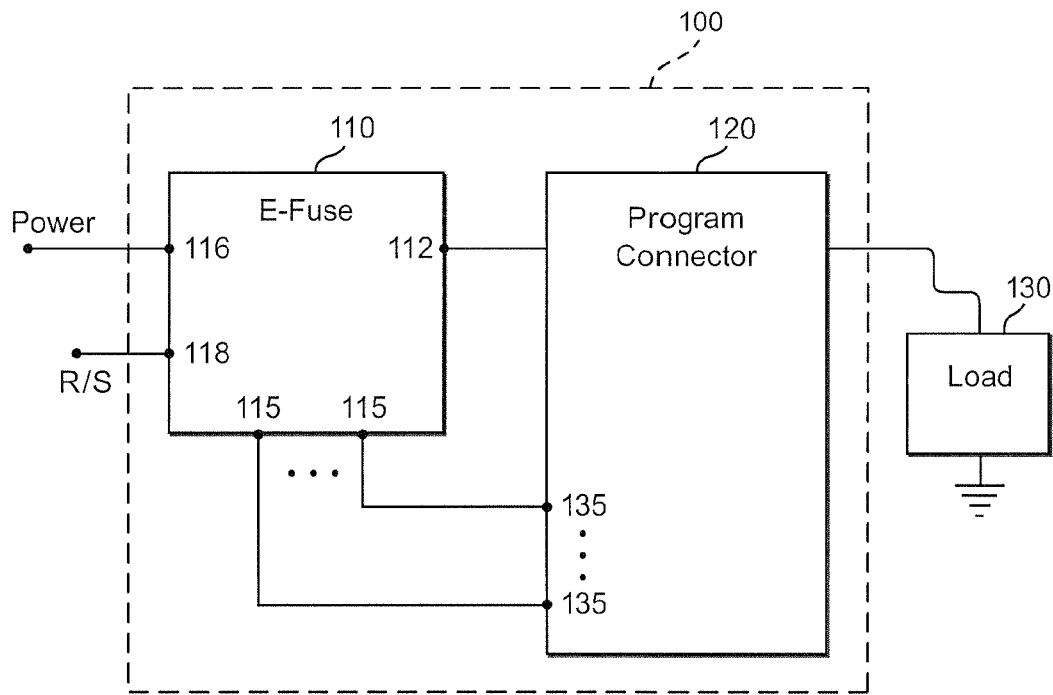
FIGS. 1A and 1B illustrate example embodiments of field programmable fuses.
Figure 1B:
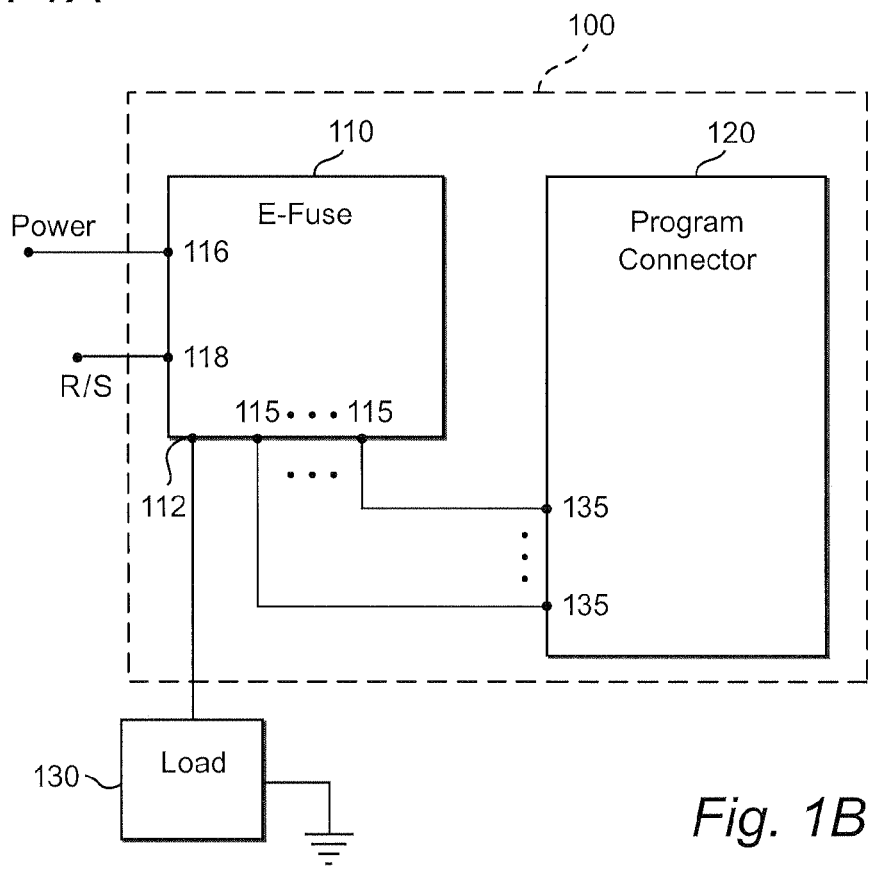

FIGS. 1A and 1B illustrate example embodiments of field programmable fuses 100. In other words, the trip values of the programmable fuses 100 are not fixed upon production, but can be programmed in the field—that is, after production-many times over as the need arises. The field programmable fuses 100 can be tailored for AC only, for DC only, or for a combination of AC and DC systems.

In the example embodiments illustrated in FIGS. 1A and 1B, the field programmable fuse 100 includes an electronic fuse 110. The electronic fuse 110 is configured to provide power from an external source coupled to its power input 116 to a load device 130 that is coupled to its power output 112. The electronic fuse 110 also includes one or more field selectable trip value inputs 115 such that the trip value of the electronic fuse 110 is set based on the values applied to the field selectable trip value inputs 115.

Inputs to the trip value inputs 115 may be provided directly. Optionally, the programmable fuse 100 may also include a programming connector 120 with programming pins 135 connected to the trip value inputs 115. The program connector 120 can make the process of selecting the trip value easier and less error prone.

The load device 130 may be connected directly to the electronic fuse 110 as illustrated in FIG. 1B or through the program connector 120 as illustrated in FIG. 1A. When connected through the program connector 120 as in FIG. 1A, the number of trip value inputs 115 may be reduced as will be demonstrated later.

Figure 2A:
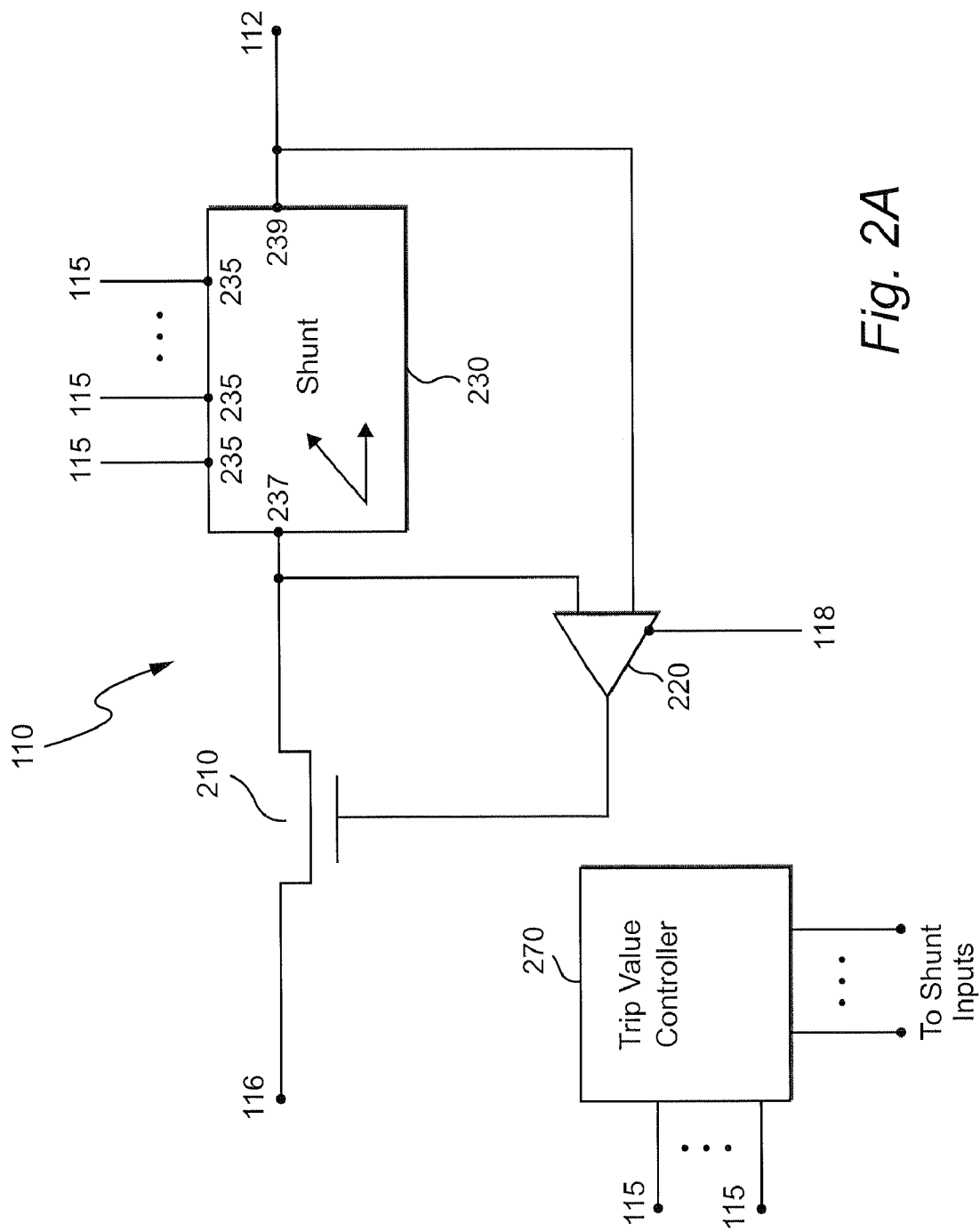
FIGS. 2A, 2B and 2C illustrate example embodiments of electronic fuses with variable (field programmable) shunts, comparators and voltage dividers, respectfully.

FIG. 2A illustrates an example embodiment of the electronic fuse 110. The electronic fuse 110 includes an electronic switch 210 and a variable shunt 230 configured to deliver power from the external source coupled to the power input 116 to the load device 130 coupled to the power output 112. The electronic fuse 110 also includes a comparator 220 coupled to the variable shunt 230 and is configured to measure a voltage drop across the variable shunt 230. When the voltage drop across the variable shunt 230 is above or substantially at a pre-determined threshold, the voltage comparator 220 outputs a TURN OFF signal to the electronic switch 210, at which the electronic switch 210 switches off the delivery of the load current.

In this particular embodiment, the variable shunt 230 (denoted by the angle sign) is configured to vary its impedance value based on the trip value settings provided at the trip value inputs 115. By varying the impedance value of the variable shunt 230, the trip value of the electronic fuse 110 is also varied. In this embodiment, the voltage drop across the variable shunt 230 is a product of the load current flowing through the variable shunt 230 and its impedance. If the impedance is lowered, the trip value is accordingly increased since the voltage drop across the variable shunt 230 is correspondingly lowered. Conversely, increasing the impedance of the variable shunt 230 decreases the trip value.

Figure 3A:
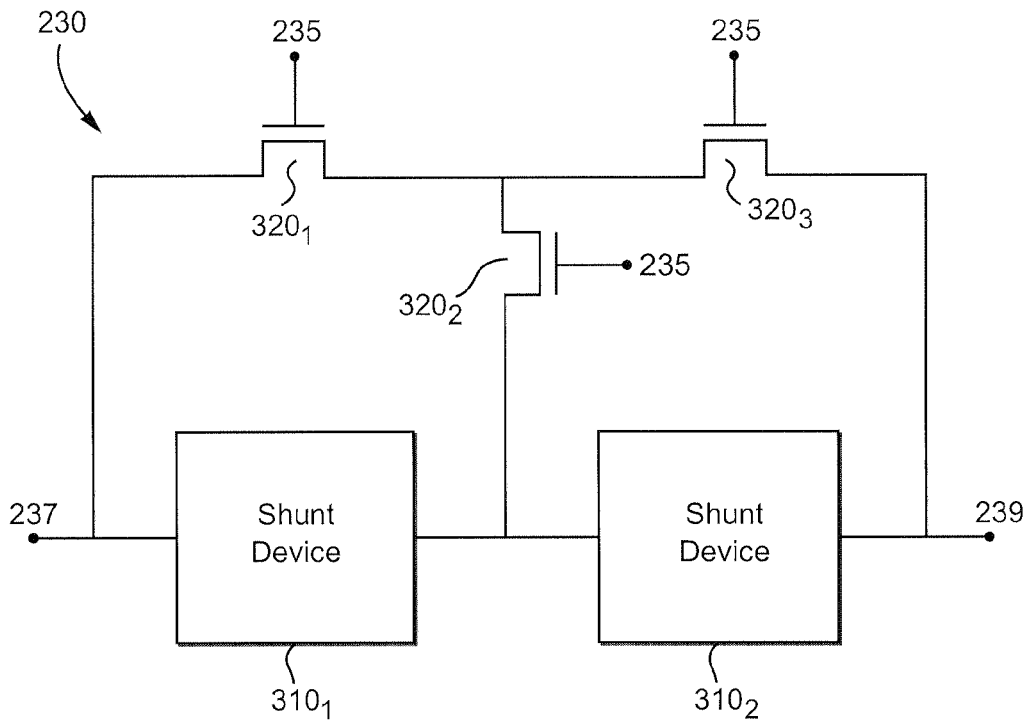
FIGS. 3A and 3B illustrate example implementations of the variable shunts.
Figure 3B:
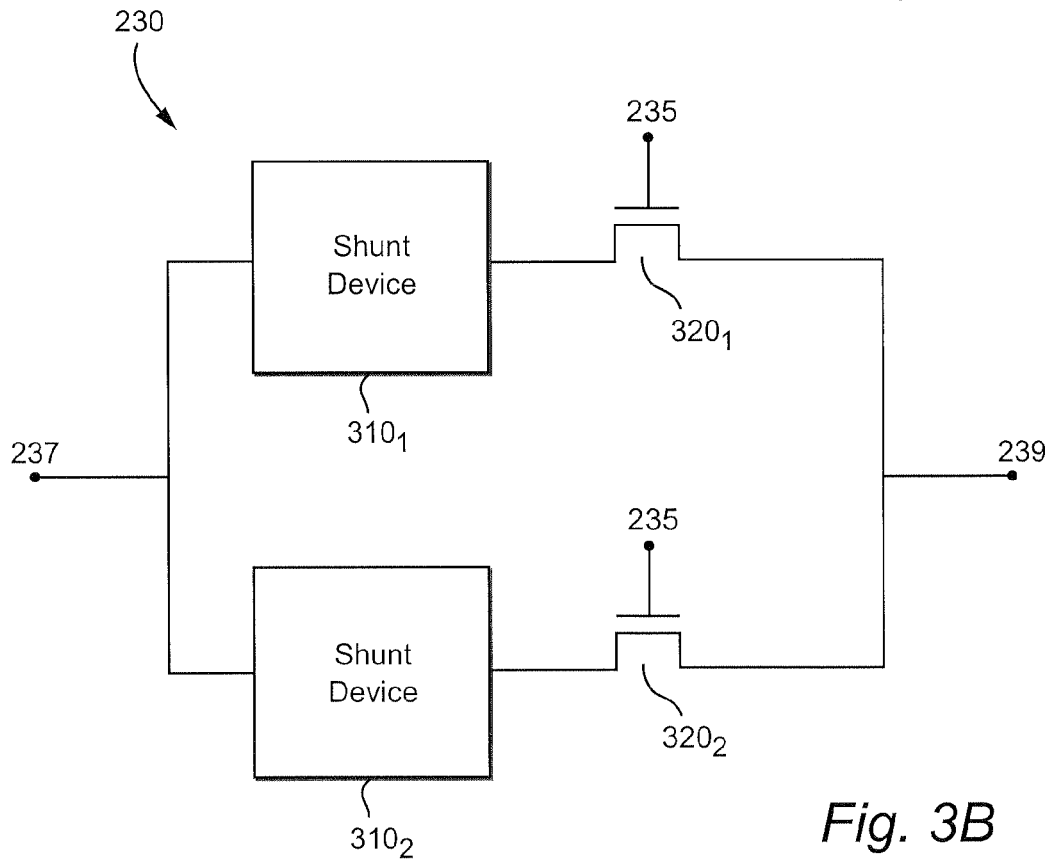

FIGS. 3A and 3B illustrate example implementations of the variable shunt 230. The variable shunt 230 includes a plurality of shunt devices 310 and a plurality of bypass gates 320. The shunt devices 310 are operatively coupled to deliver the load current from the external source to the load device, and the bypass gates 320 are coupled to the plurality shunt devices 310 and provide a capability to selectively bypass one or more of the shunt devices 310. While only two shunt devices 310 are illustrated in both FIGS. 3A and 3B, it is to be noted that any number of shunt devices may be utilized. Similarly, the number of bypass gates 320 are not limited to the illustrated example implementations.

In FIG. 3A, the plurality of devices 310 are connected in series. To provide selective bypassing capabilities, the plurality of bypass gates 320 are provided. By selectively activating gates 235 of the bypass gates 320, an electrical pathway may be made to bypass either of shunt devices $310_1$ or $310_2$. For proper operation, the load current from input 237 should pass through at least one of the shunt devices $310_1$ and $310_2$.

For maximum flexibility, it is preferred that the impedances of each shunt device 310 be different. For example, the first shunt device $310_1$ may have an impedance value of $1\Omega$ and the second shunt device $310_2$ may have an impedance value of $2\Omega$. With selective bypassing through activating different combinations of the bypass gates, different total impedance values for the variable shunt 230 may be achieved.

As an example, the load current may be made to flow only through the first shunt device $310_1$ by deactivating the first bypass gate $320_1$ and activating second and third bypass gates $320_2$ and $320_3$. As another example, the load current may be made to flow only through the second shunt device $310_2$ by activating first and second bypass gates $320_1$ and $320_2$ and deactivating the third bypass gate $320_3$. Finally, the low current may be made to flow through both first and second shunt devices $310_1$ and $310_2$ by deactivating the first and third bypass gates $320_1$ and $320_3$.

The plurality of shunt devices 310 may also be coupled in parallel with each other as illustrated in FIG. 3B. In this implementation, the total impedance of the variable shunt 230 can be achieved by activating/deactivating different combinations of the bypass gates $320_1$ and $320_2$.

While FIGS. 3A and 3B illustrated series implementation and parallel implementation in isolation, having a combination of both fall within the scope of the disclosure. Also, having any number of shunt devices 310 and bypass gates 320 fall within the scope of the disclosure.

Referring back to FIG. 2A, it is shown that the trip value inputs 115 may be provided directly to the inputs 235 of the variable shunts 230. In an alternative, the electronic fuse 110 may include a trip value controller 270 which takes as inputs the values set on the trip value inputs 115 and outputs control signals to the inputs 235 of the variable shunt 230. An advantage of the trip value controller 270 is that it can minimize the number of trip value inputs 115 that are required to interface with an external programming controller while providing a fine granularity of trip value settings within the electronic fuse 110.

For explanation purposes, FIG. 3A shows three bypass gates 320 that can be individually activated to bypass either the first or the second shunt device $310_1$ or $310_2$. If the gate inputs 235 of the bypass gate 320 are directly coupled to the trip value inputs 115, then three trip value inputs 115 will be required. However, referring back to FIG. 2A, if the inputs 235 are connected to the trip value controller 270, then only two trip value inputs 115 will be required assuming that the trip value inputs 115 take on a binary signal. This is because there are only three combinations possible in FIG. 3A. If the trip value input 115 can take on more than two electrical values—such as power, ground and some intermediate value—then the number of trip value input 115 can be reduced to one for both FIGS. 3A and 3B.

Figure 2B:
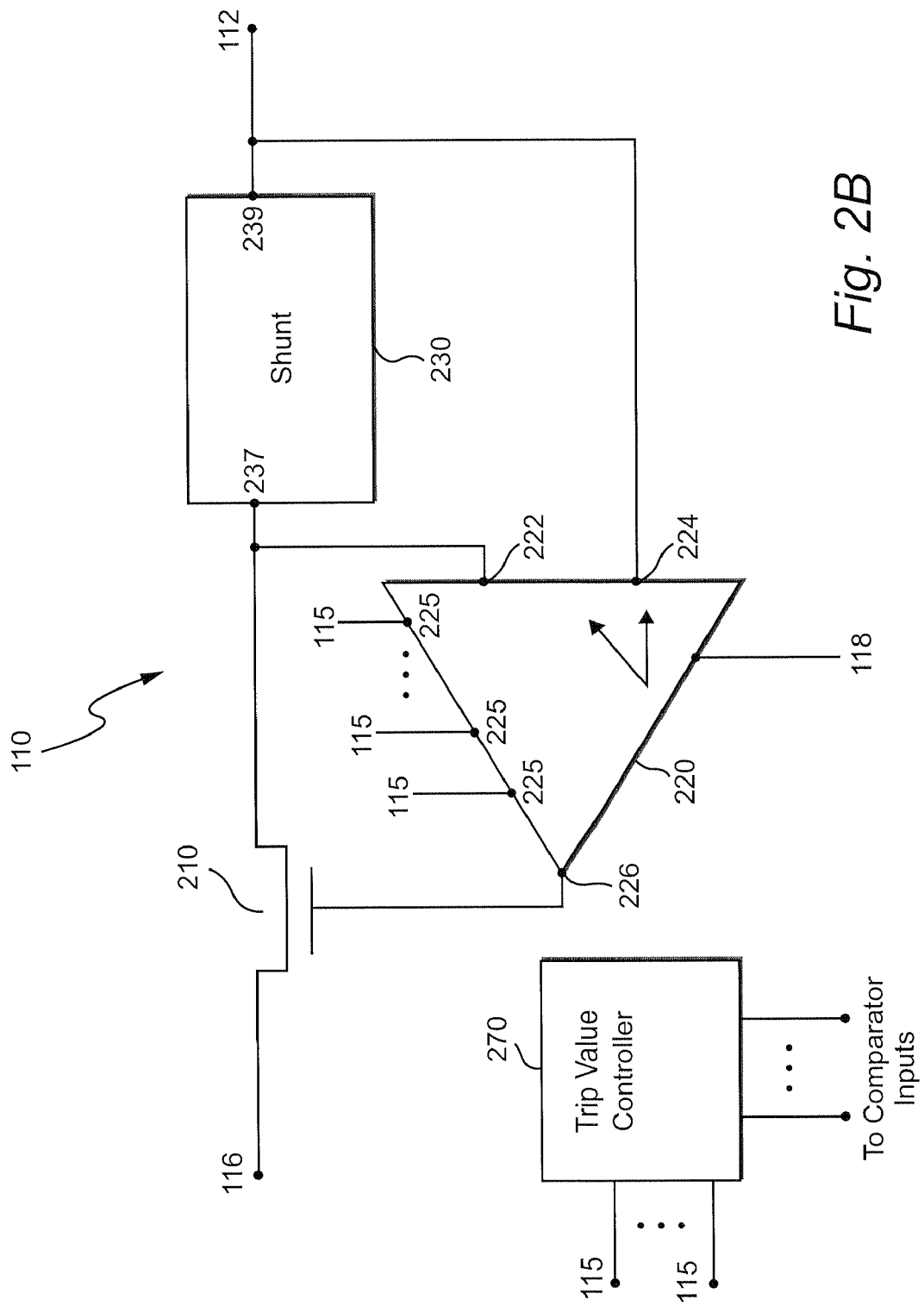

In addition to or instead of the variable shunt 230, the field programming capability may be provided by the variable comparator 220 as illustrated in FIG. 2B. In this embodiment, the comparator 220 is variable in a sense that the threshold voltage at which the TURN OFF signal is provided is varied according to the trip value set based on the inputs provided to the trip value inputs 115. If it is desired to increase the trip value, the threshold voltage may be increased. If it is desired to decrease the trip value, then the threshold voltage may be decreased.

The trip value inputs 115 may be provided directly to the variable comparator 220 via the comparator inputs 225 as shown in FIG. 2B, or may be provided through the trip value controller 270 as understood from the previous description.

Figure 2C:
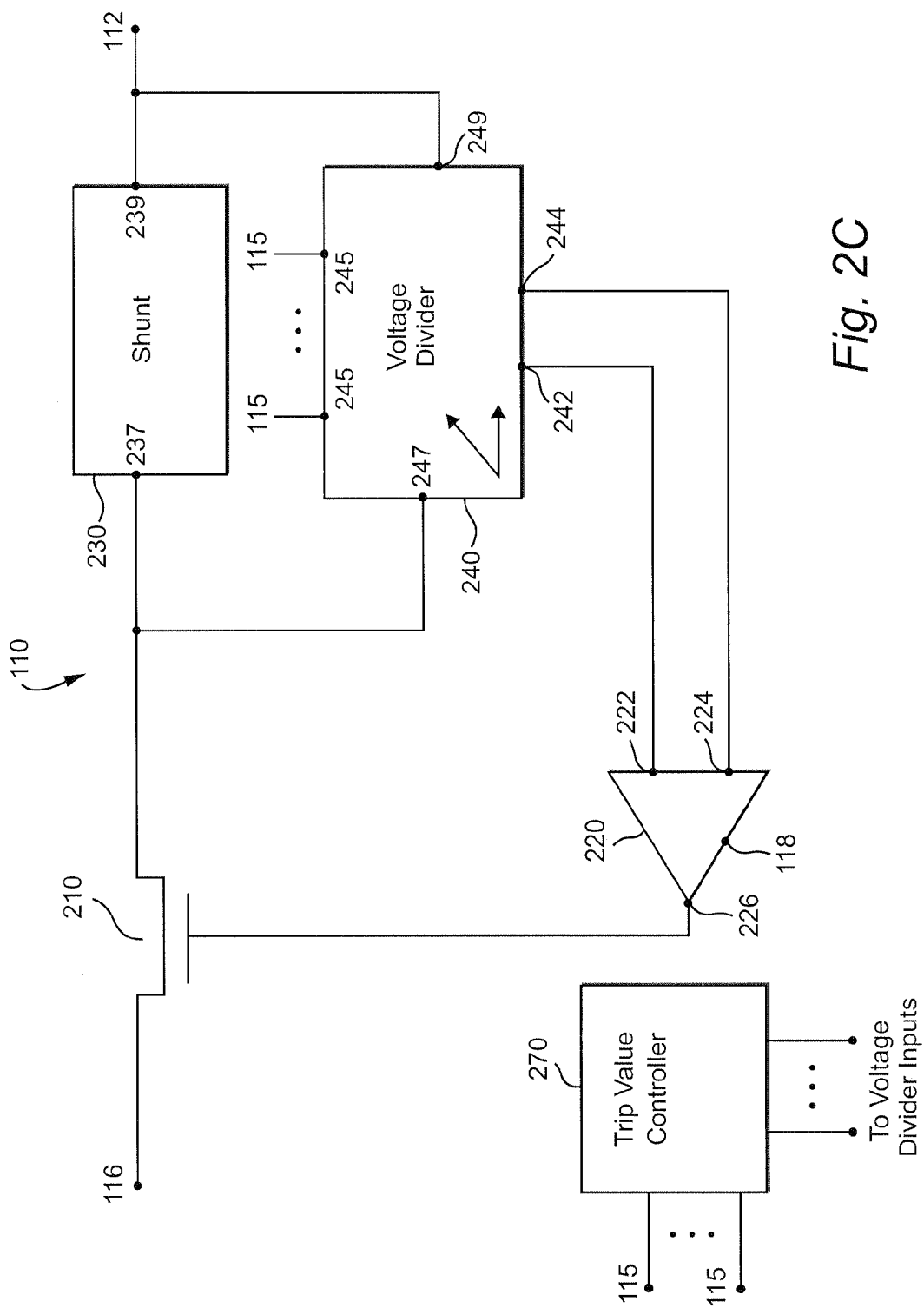

In both FIGS. 2A and 2B, the comparator 220 outputs the TURN OFF signal based on the threshold voltage drop across the whole of the shunt 230. In another embodiment, a variable voltage divider 240 may be provided as illustrated in FIG. 2C. The variable voltage divider 240 provides a divided voltage to the comparator 220. The voltage divider 240 outputs a portion of the voltage drop measured across the shunt 230 as the divided voltage. By varying the divided voltage output—that is by varying the portion of the voltage drop across the shunt 230 that is output to the comparator 220 according to the inputs provided to the voltage divider inputs 245 through trip value inputs 115—the trip value of the electronic fuse 110 may be selectively set.

Figure 4A:
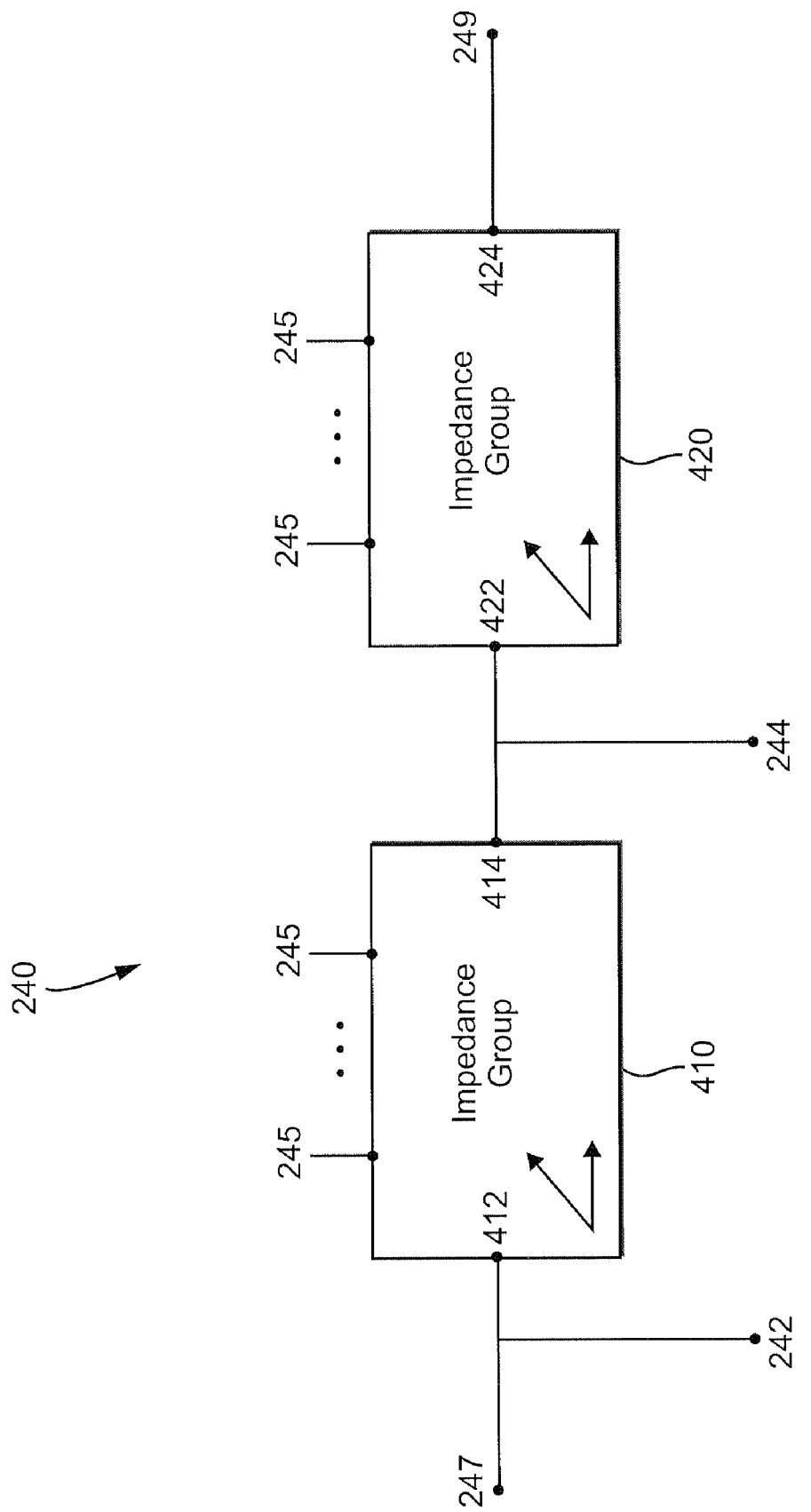
FIGS. 4A and 4B illustrate example embodiments of voltage dividers that include a plurality of impedance groups.
Figure 4B:
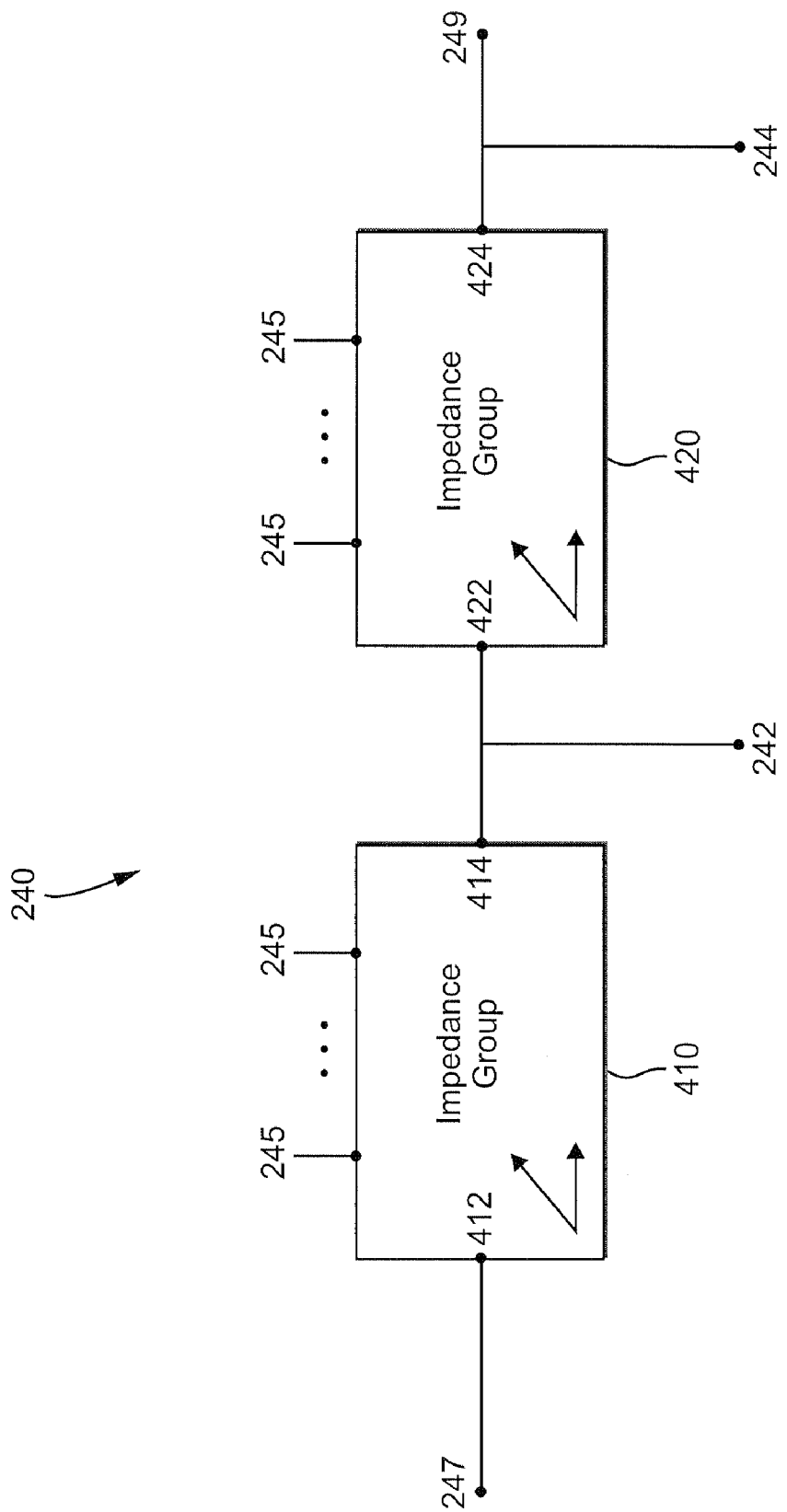

FIGS. 4A and 4B illustrate example implementations of the voltage divider 240. In both embodiments, the voltage divider 240 includes first and second impedance groups 410 and 420 connected in series. The first impedance group 410 has a first impedance value and the second impedance group 420 has a second impedance value. Both the first and second impedance values 410, 420 can be varied based on the trip value settings. In FIG. 4A, the voltage drop across the first impedance group is output as the divided voltage and in FIG. 4B, the voltage drop across the second impedance group 420 is output as the divided voltage.

Figure 5A:
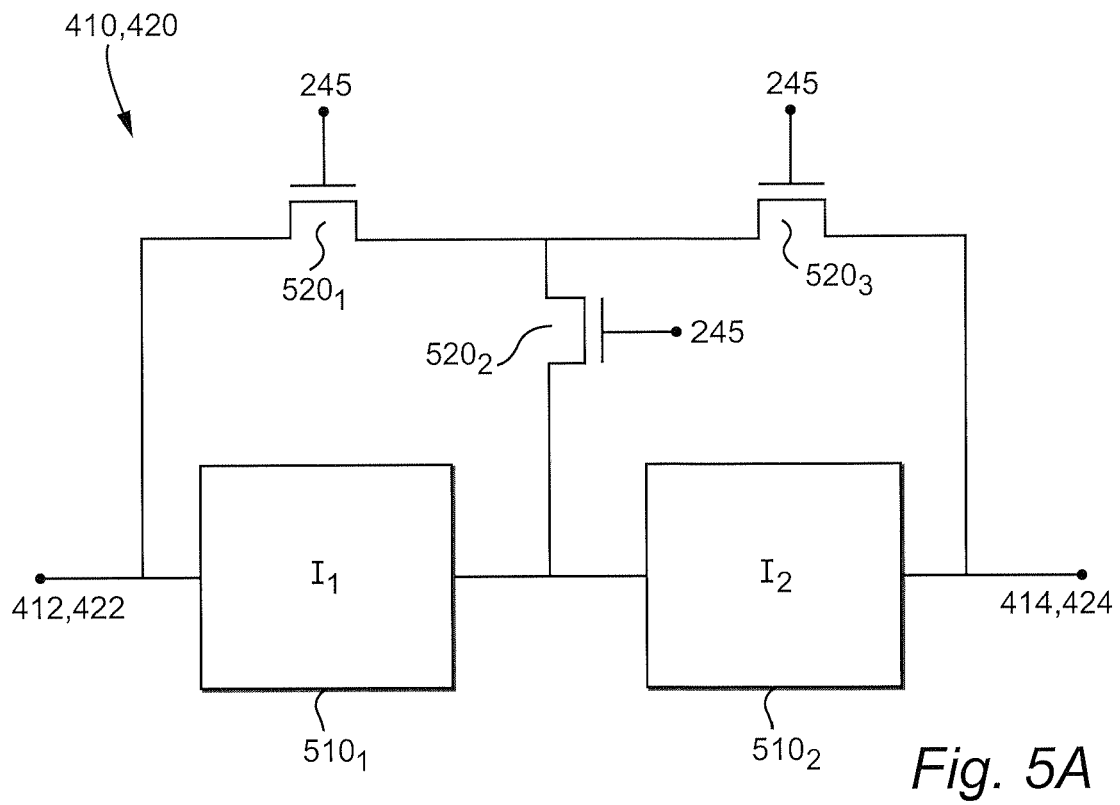
FIGS. 5A and 5B illustrate example implementations of the impedance groups.
Figure 5B:
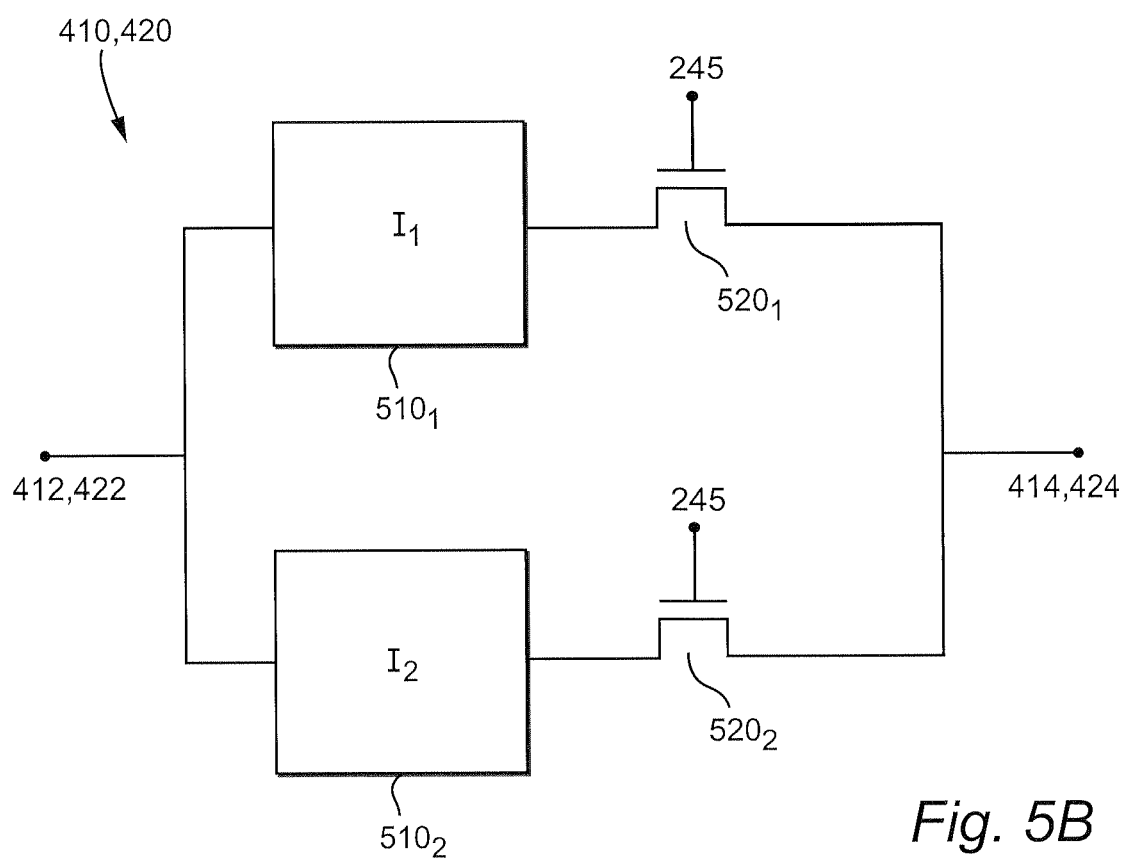

One or both of the impedance groups 410, 420 may be implemented as illustrated in FIGS. 5A and 5B. The impedance groups include a plurality of impedance devices 510 along with a plurality of bypass gates 520 connected to selectively bypass the impedance devices 510. The impedance devices 510 may be connected in series or in parallel with each other. It is also contemplated that various combinations of serial and parallel combinations are within the scope of the disclosure. The structure of the impedance groups 410, 420 are similar to the plurality of shunt devices 310 as illustrated in FIGS. 3A and 3B. Thus, detailed description of the operations of the impedance groups will be omitted.

Again, the trip value controller 270 may be optionally provided to control the operations of the impedance groups 410, 420.

Referring back to FIGS. 1A and 1B, the programmable fuse 100 optionally includes the programming connector 120 coupled to the electronic fuse 110. The programming connector 120 includes a plurality of programming pins 135 that are field settable to take on one of a plurality of electrical values. The trip value of the electronic fuse 110 is determined by a combination of the electrical values set on the programming pins 135.

Figure 9:
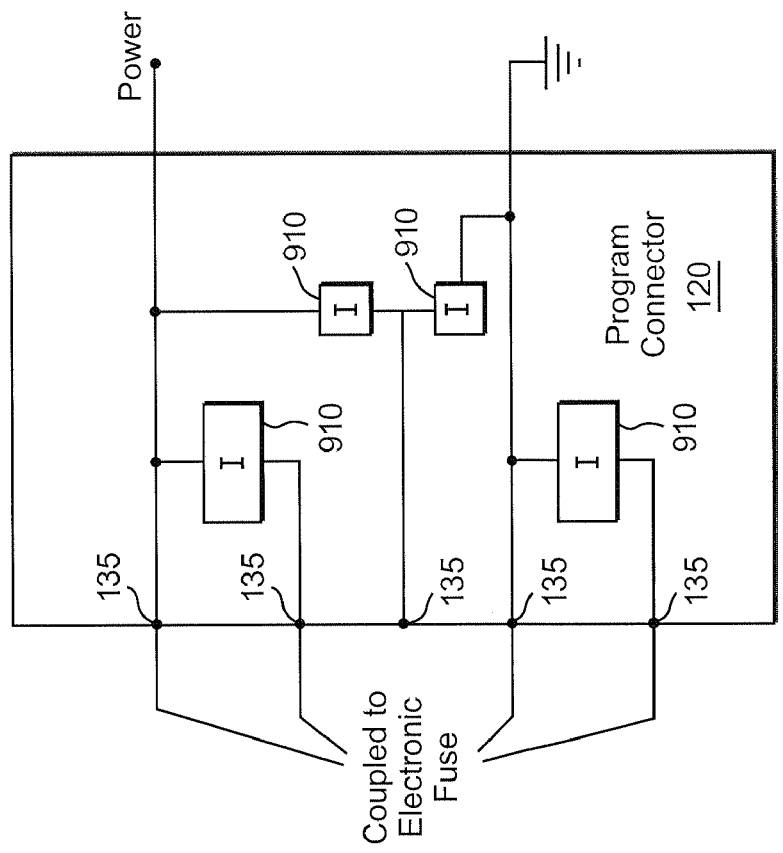
Figure 8:
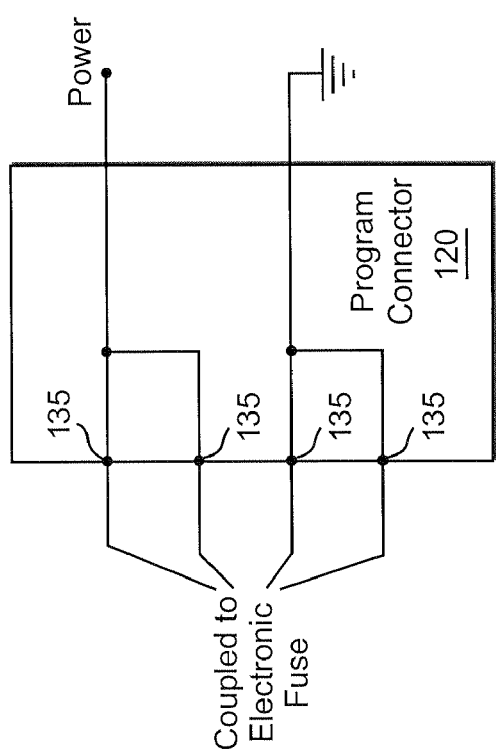

The electrical values can be any one of open (i.e., not connected), ground, power, and one or more voltage values other than the ground and the power. FIGS. 6-9 illustrate various implementations of setting the electrical values to the programming pins 135. In FIGS. 6A-6D for example, the programming pins 135 are set to take on one of two electrical values—connected to ground or open. Various combinations of the electrical values applied to the programming pins 135 determine the trip value setting. In FIGS. 7A-7D, the programming pins may take on one of power or open. In FIG. 8, the programming pins may take on one of three values—open, connected to power and connected to ground. FIG. 9 illustrates that intermediate voltages may also be provided by providing impedance devices 910 connected to either the ground or the power. Combining the features of FIGS. 6A-6D, 7A-7D, 8 and 9 are within the scope of the disclosure.

Figure 10:
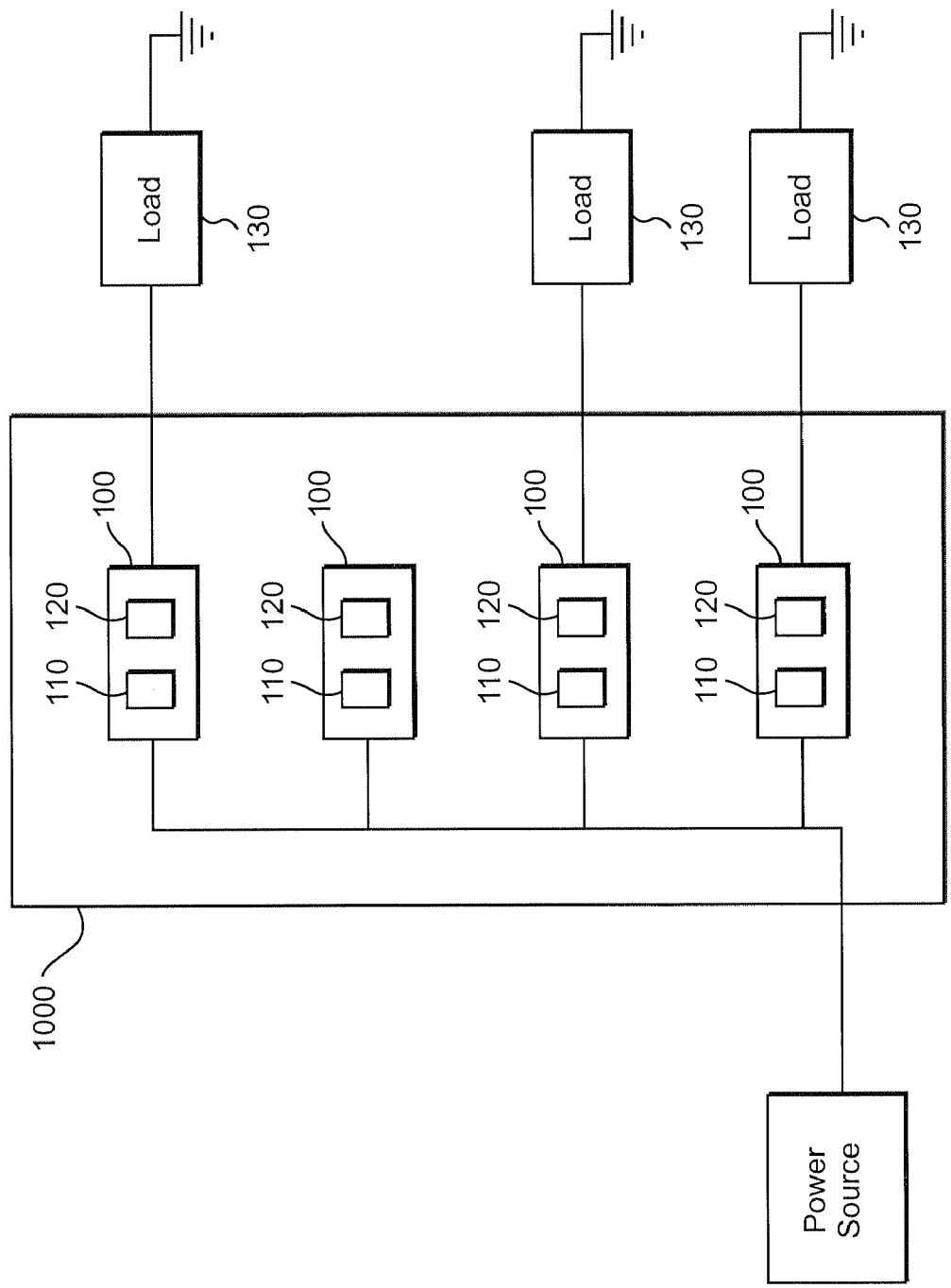
FIG. 10 illustrates an example embodiment of a fuse panel.

FIG. 10 illustrates an embodiment of a fuse panel 1000. The fuse panel 1000 includes a plurality of programmable fuses 100. While not specifically shown, the fuse panel 1000 can also include one or more fixed fuses. The fuse panel 1000 is generic in that the trip values of the programmable fuses 100 are not fixedly set at the time of production. With this fuse panel, as long as there is a programmable fuse 100 available, another load device 130 may be added. Thus, the expense and difficulty associated with the conventional fuse panels are avoided. Each programmable fuse 100 can be individually programmed apart from other fuses. Also, a subset, that is two or more of the programmable fuses 100, less than the whole, can be simultaneously field programmable.

Figure 11:
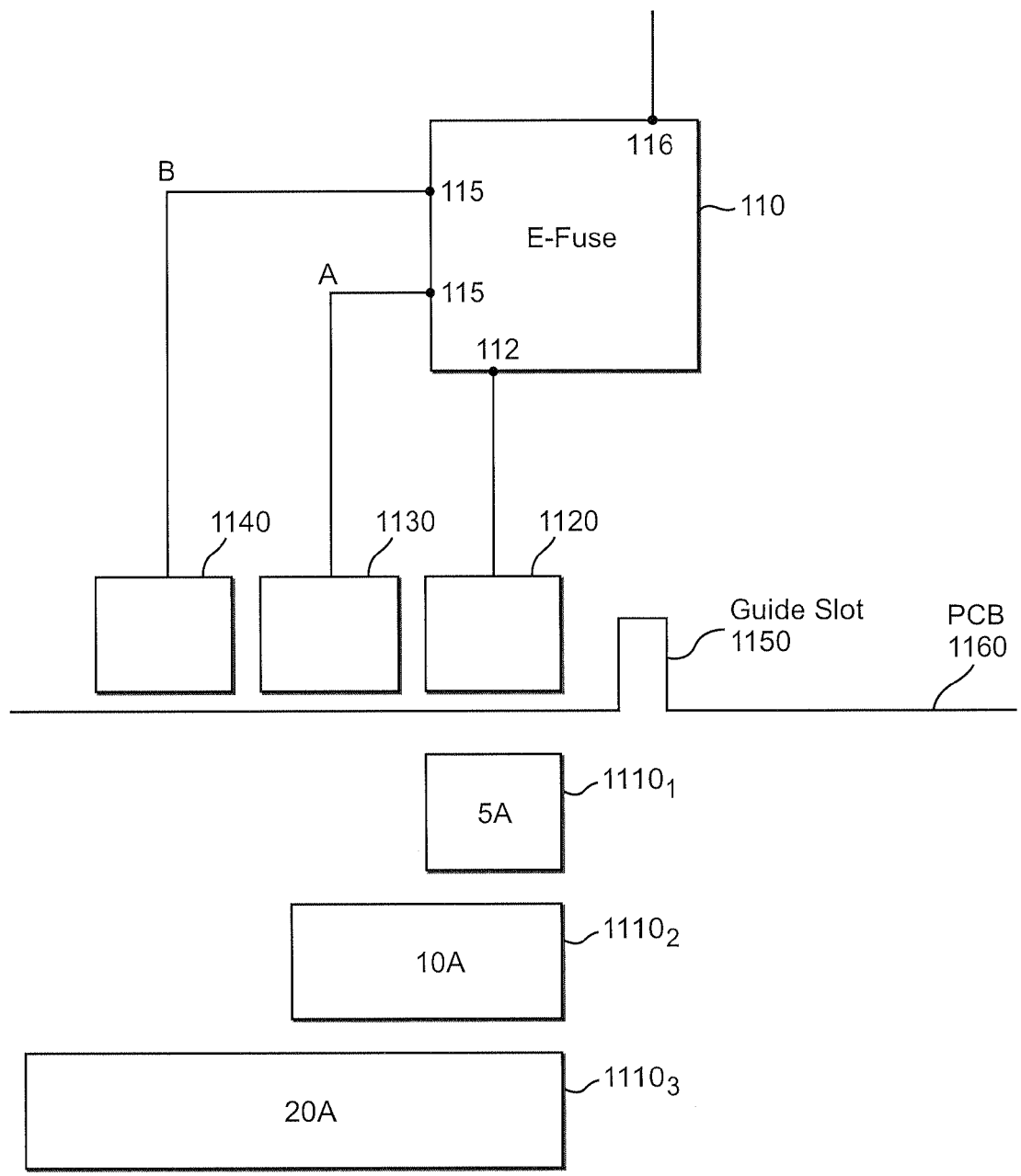
FIG. 11 illustrates an example embodiment of a mechanical implementation of a fuse panel setup.
Figure 12:
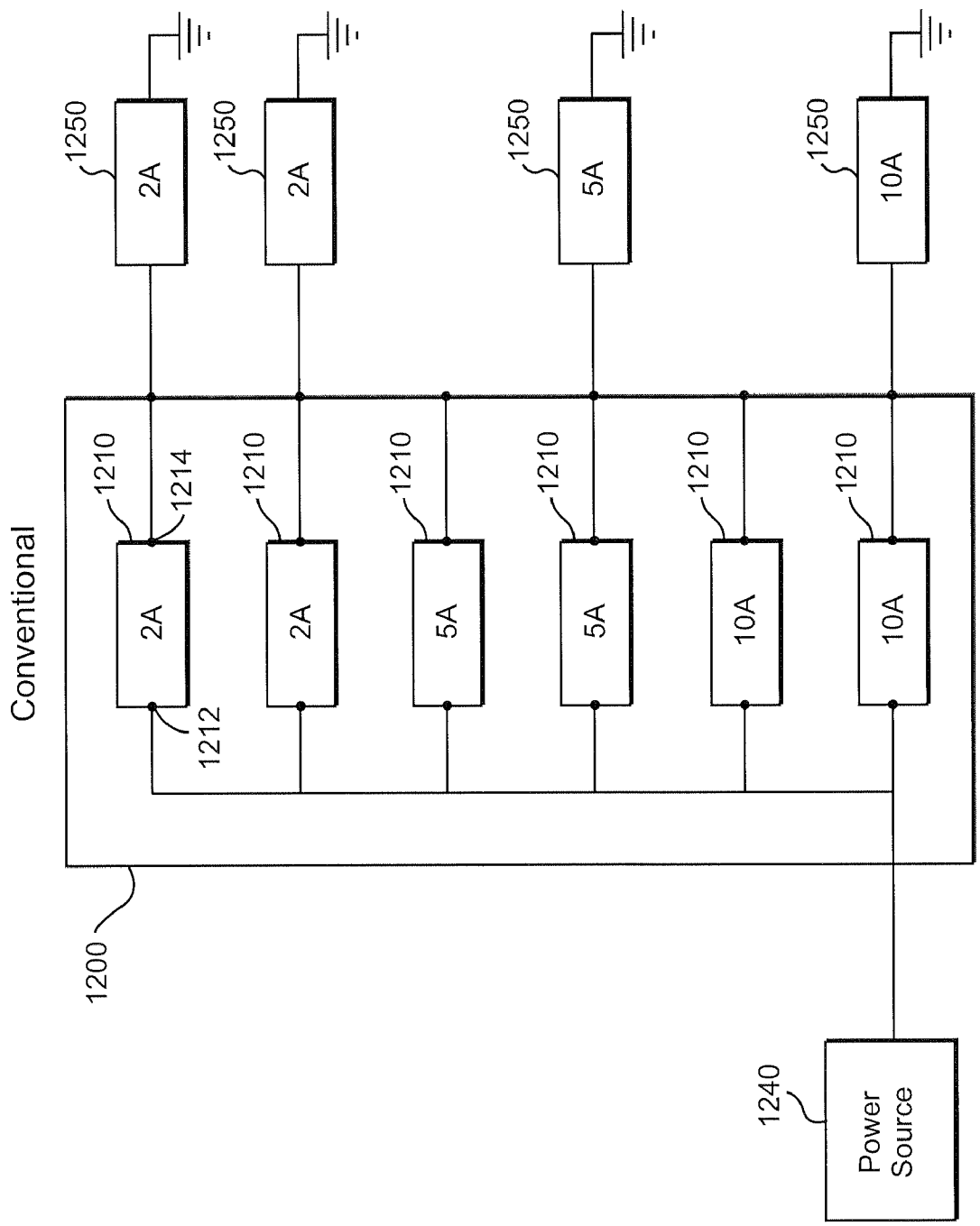
FIG. 12 illustrates a conventional fuse panel.
Figure 13:
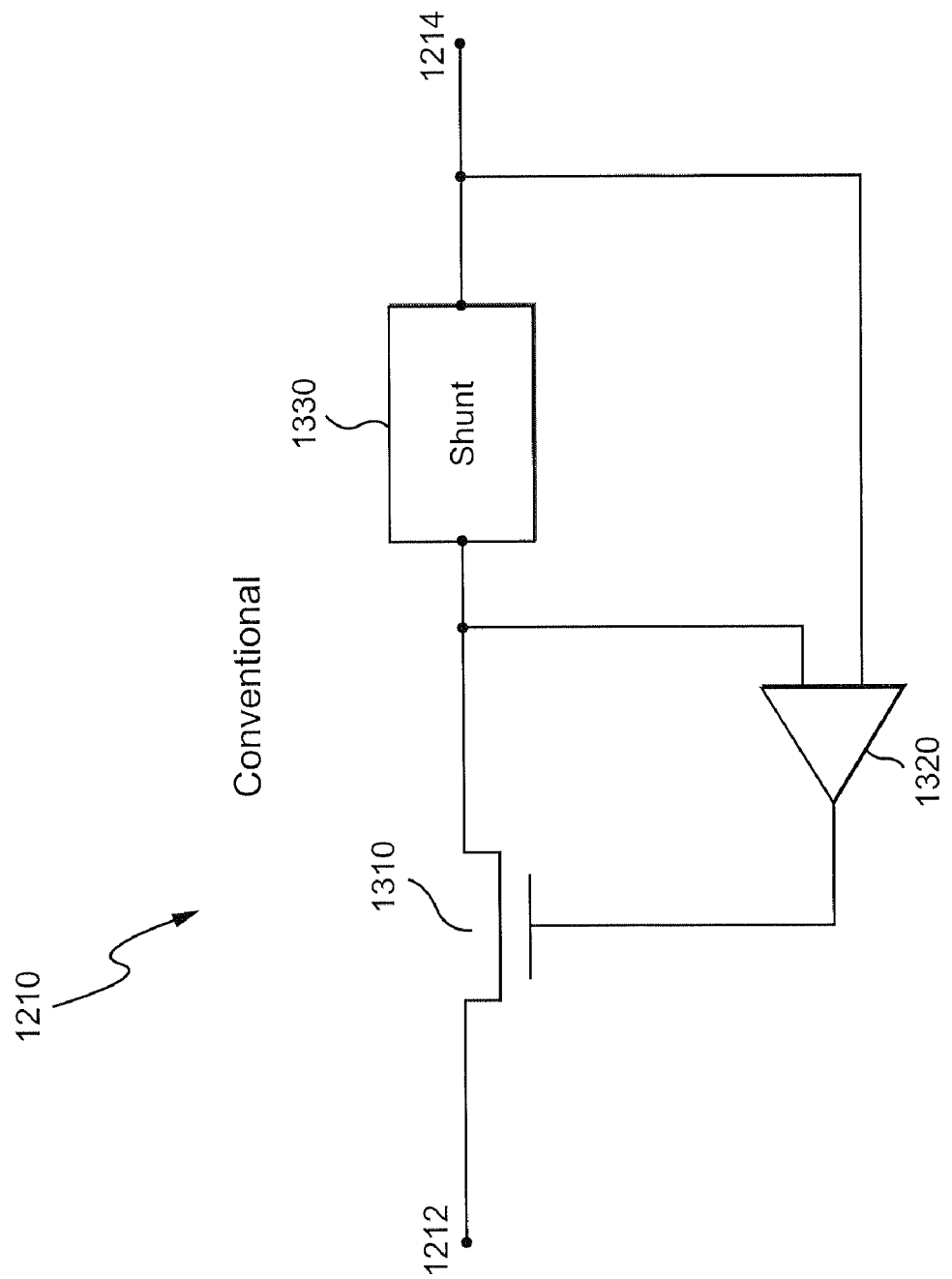
FIG. 13 illustrates a conventional electronic fuse.

The fuses 100 and the fuse panel 1000 can be implemented mechanically, for example, as a fuse panel connector implemented as an edge connector directly on a printed circuit board (PCB). FIG. 11 illustrates an embodiment of this concept. On one side of the PCB 1160, programming fingers 1130, 1140 are located. A plug is implemented as a blade 1110 on each side. The width of the blade 1110 determines the amount of current that can be used.

In FIG. 11, three blades 1110 of varying widths are illustrated. In general, the wider the blade width, the higher current than can be used. The trip value programming is performed by the blade 1110 connecting to the one or more programming fingers 1130 and 1140 to a power or to ground. In this embodiment, if the 10 A blade $1110_2$ is connected, the programming finger 1130 is connected to the power 1120 (providing a signal to the "A" trip value input) while the programming finger 1140 is left unconnected (providing no signal to the "B" trip value input). When the 20 A blade $1110_3$ is connected, both programming fingers are connected to power to provide signals to the "A" and "B" trip value inputs 115 of the electronic fuse 110. Conversely, when a 5 A blade is connected, no programming finger are connected. This implementation has the advantage that an intuitive indication of the current setting is provided.

It should be noted that other connector alternatives are possible. For example, instead of being connected to power, the programming fingers 1130 and 1140 may be made to connect to a ground or some other voltage when a blade 1110 of proper width is connected depending on the application. The load select blade 1110 may be integrated into a single physical piece with a load input of the load device 130. Alternatively, the load select blade 1110 may be integrated into a single physical piece with the power output 112 of the programmable fuse 100.

Again referring back to FIGS. 1A and 1B, the electronic fuse 110 can optionally include a reset (R/S) input 118 to provide a capability to reset the electronic fuse 110. When the trip value of the electronic fuse 110 is exceeded, the electronic fuse 110 switches off. For example, the comparator 220 can output the TURN OFF signal to the electronic switch 210 in FIGS. 2A-2C. When the R/S input 118 is activated under this type of a conditions, the electronic fuse 110 switches ON.

The R/S input 118 may be used for safety as well. For example, when no load device is connected to the electronic fuse 110, the R/S input 118 may be used to cause the comparator 220 to output the TURN OFF signal to the electronic switch 210. In this way, no power is output when there is no load on the electronic fuse 210 promoting safety. When a mechanical implementation such as illustrated in FIG. 11 is considered, determining whether or not a load device is connected will be possible simply by determining whether or not the load select blade 1110 is absent or present. The R/S input 118 is not the only way to implement the safety feature. In general, it is sufficient to detect whether or not a load device 130 is connected and to prevent the power from reaching the power output 112 of the electronic fuse 110 when there is no load device 130 connected.

The following advantages are realized by one or more of the disclosed embodiments. These include being able to provide a generic programmable fuse panel designed for all types of outputs, trip values that are decided in the field by the loads or the settings, maximizing the fuse utilization, and being able to free fuse positions for any load devices independent of the current needed.

While described with reference to the example embodiments thereof, those skilled in the art will be able to make various modifications to the described embodiments. The terms and descriptions used herein are set forth by way of illustration only and are not meant as limitations. Those skilled in the art will recognize that these and other variations are possible. The invention is defined in the following claims and their equivalents.

What is claimed is:

1. A field programmable fuse, comprising:
an electronic fuse configured to deliver a load current from an external source via a power input to a load device via a power output, the electronic fuse comprising one or more field selectable trip value inputs such that a trip value of the electronic fuse is set based on electrical values applied to the one or more field selectable trip value inputs such that when an amount of the load current delivered to the load device exceeds the trip value set for the electronic fuse, the electronic fuse is configured to cease delivering the load current to the load device; and
a programming connector comprising one or more programming pins operatively coupled to the one or more field selectable trip value inputs of the electronic fuse, each programming pin being field settable to take on one of a plurality of electrical values such that the trip value of the electronic fuse is determined by a combination of the electrical values set on the one or more programming pins.

2. The field programmable fuse of claim 1, wherein the electronic fuse comprises:
a variable shunt configured to deliver the load current from an external source to the load device;
a voltage comparator operatively coupled to the variable shunt and configured to measure a voltage drop across the variable shunt; and
an electronic switch operatively coupled to the variable shunt and to the voltage comparator and configured to switch ON and OFF the delivery of the load current from the external source to the variable shunt,
wherein the voltage comparator is configured to output a TURN OFF signal to the electronic switch when the voltage drop across the variable shunt is above or substantially at a predetermined threshold,
wherein the electronic switch is configured to switch OFF the delivery of the load current when the TURN OFF signal is received from the voltage comparator, and
wherein the variable shunt is configured to vary its impedance value based on the trip value set for the electronic fuse.

3. The field programmable fuse of claim 2, wherein the electronic fuse further comprises a trip value controller operatively coupled to the trip value inputs, wherein the trip value controller is configured to control the impedance value of the variable shunt based on the electrical values applied to the trip value inputs.

4. The field programmable fuse of claim 2, wherein the variable shunt comprises:
a plurality of shunt devices operatively coupled to deliver the load current from the external source to the load device; and
a plurality of bypass gates operatively coupled to the plurality of shunt devices to provide a capability to selectively bypass one or more of the plurality of shunt devices,
wherein the plurality of bypass gates are configured to bypass different combinations of the plurality of shunt devices based on different trip value settings.

5. The field programmable fuse of claim 4,
wherein in at least one shunt device is operatively coupled in parallel with at least one other shunt device, or
wherein in at least one shunt device is operatively coupled in series with at least one other shunt device, or
both.

6. The field programmable fuse of claim 1, wherein the electronic fuse comprises:
a shunt configured to deliver the load current from an external source to the load device;
a variable voltage comparator operatively coupled to the shunt and configured to measure a voltage drop across the shunt; and
an electronic switch operatively coupled to the shunt and to the variable comparator and configured to switch ON and OFF the delivery of the load current from the external source to the shunt,
wherein the variable voltage comparator is configured to set a threshold voltage based on the trip value set for the electronic fuse, and output a TURN OFF signal to the electronic switch when the voltage drop across the variable shunt is above or substantially at the threshold voltage, and
wherein the electronic switch is configured to switch OFF the delivery of the load current when the TURN OFF signal is received from the variable voltage comparator.

7. The field programmable fuse of claim 6, wherein the electronic fuse further comprises a trip value controller operatively coupled to the trip value inputs, wherein the trip value controller is configured to control the setting of the threshold voltage of the variable comparator based on the electrical values applied to the trip value inputs.

8. The field programmable fuse of claim 1, wherein at least one programming pin is field settable to take on any one of electrically open, ground, power, and one or more voltage values other than the ground and the power.

9. The field programmable fuse of claim 8, wherein the programming connector further comprises at least one impedance device operatively coupled to at least one of the one or more programming pins such that the electrical value of the coupled programming pin is set to be a voltage other than the ground and the power.

10. The field programmable fuse of claim 1, wherein load device is operatively connected to the electronic fuse via the programming connector.

11. A fuse panel, comprising a plurality of field programmable fuses as recited in claim 1.

12. The fuse panel of claim 11, wherein at least one field programmable fuse is individually field programmable apart from other programmable fuses of the fuse panel.

13. The fuse panel of claim 11, wherein a subset of field programmable fuses are simultaneously field programmable.

14. The fuse panel of claim 13, wherein the subset of simultaneous field programmable fuses is less than a whole of the field programmable fuses.

15. The field programmable fuse of claim 1,
wherein the trip value inputs are physically spaced apart from each other,
wherein the load device includes a load select blade such that when inserted, one or more of the trip value inputs come into physical contact with the load select blade, and wherein the trip value set for the electronic fuse is based on a combination of the trip value inputs that come into contact with the load select blade.

16. The field programmable fuse of claim 15, wherein the load select blade is integrated into a single physical piece with a load input of the load device or into the power output of the programmable fuse.

17. The field programmable fuse of claim 1, wherein the electronic fuse comprises a R/S input such that when the R/S input is activated while the electronic fuse is switched OFF, the electronic fuse is configured to switch ON.

18. The field programmable fuse of claim 1, wherein the electronic fuse configured to detect whether or not the load device is connected to the power output and configured to prevent power from reaching the power output when no load device is connected.

19. A field programmable fuse comprising an electronic fuse configured to deliver a load current from an external source via a power input to a load device via a power output, wherein the electronic fuse comprises:
one or more field selectable trip value inputs configured such that a trip value of the electronic fuse is set based on electrical values applied to the trip value inputs;
a shunt configured to deliver the load current from an external source to the load device;
a variable voltage divider operatively coupled the shunt and configured to output a portion of a voltage drop across the shunt as a divided voltage;
a voltage comparator operatively coupled to the variable voltage divider and configured to measure the divided voltage from the variable voltage divider; and
an electronic switch operatively coupled to the shunt and to the voltage comparator and configured to switch ON and OFF the delivery of the load current from the external source to the shunt,
wherein the voltage comparator is configured to output a TURN OFF signal to the electronic switch when the divided voltage from the variable voltage divider is above or substantially at a predetermined threshold,
wherein the electronic switch is configured to switch OFF the delivery of the load current when the TURN OFF signal is received from the voltage comparator, and
wherein the variable voltage divider is configured to set the portion of the voltage drop across the shunt outputted as the divided voltage based on the trip value set for the electronic fuse.

20. The field programmable fuse of claim 19, wherein the electronic fuse further comprises a trip value controller operatively coupled to the trip value inputs, wherein the trip value controller is configured to control the setting of the portion of the voltage drop across the shunt outputted as the divided voltage based on the electrical values applied to the trip value inputs.

21. The field programmable fuse of claim 19, wherein the variable voltage divider comprises:
a first impedance group having a first impedance value and operatively coupled to the electronic switch; and
a second impedance group having a second impedance value and operatively coupled in series with the first impedance group and also operatively coupled with the power input,
wherein one of a voltage drop across the first impedance group or the second impedance group is output as the divided voltage, and
wherein one or both of the first and second impedance groups are configured to vary their impedance values based on the trip value set for the electronic fuse.

22. The field programmable fuse of claim 21, wherein at least one of the first impedance group and the second impedance group comprises:
a plurality of impedance devices operatively coupled to each other; and
a plurality of bypass gates operatively coupled to the plurality of impedance devices to provide a capability to selectively bypass one or more of the plurality of impedance devices,
wherein the plurality of bypass gates are configured to bypass different combinations of the plurality of impedance devices based on different trip value settings.

23. The field programmable fuse of claim 22,
wherein in at least one impedance device is operatively coupled in parallel with at least one other impedance device, or
wherein in at least one impedance device is operatively coupled in series with at least one other impedance device, or
both.

24. An electronic fuse for use in a field programmable fuse, wherein the electronic fuse is configured to deliver a load current from an external power source to an external load device, the electronic fuse comprising:
one or more trip value inputs, each trip value input being field settable to any one of plural electrical values so as to enable setting of a trip value of the electronic fuse in a field, the trip value defining a maximum limit of the load current;
a trip value controller electrically connected to the trip value inputs and configured to output one or more control signals based on the electrical values set on the trip value inputs, the control signals corresponding to the trip value;
a shunt in a current path between the external power source and the external load device such that the load current flows through shunt, the shunt being configured vary its shunt impedance based on the control signals received from the trip value controller;
a comparator configured to measure at least a portion of a voltage drop across the shunt due to the load current flowing therethrough and to output a TURN OFF signal when the measured voltage drop is at or above a threshold voltage; and
an electronic switch configured to turn off the flow of the load current from the external power source to the external load device when the TURN OFF signal is received from the comparator,
wherein a number of the trip value inputs is less than a number of control signals outputted by the trip value controller, and
wherein the shunt lowers the shunt impedance when the control signals from the trip value controller indicates that the trip value is set to be higher and vice versa.

25. The electronic fuse of claim 24, wherein at least one trip value input is field settable to take on any one of three or more electrical values.

26. The electronic fuse of claim 24, wherein the shunt comprises:
a plurality of shunt devices in the current path; and
a plurality of bypass gates coupled to shunt devices to provide a capability to selectively bypass one or more of the plurality of shunt devices,
wherein each bypass gate is coupled to receive a particular control signal from the trip value controller so as to be turned on or off based on the corresponding control signal from the trip value controller, and wherein the trip value controller outputs the control signals so as to turn on and off a particular combination of the shunt devices corresponding to the trip value set on the trip value inputs.

27. The electronic fuse of claim 24, further comprising a voltage divider configured to output a portion of the voltage drop across the shunt, the voltage portion being less than a whole voltage drop,
wherein the comparator is configured to measure the voltage portion output by the voltage divider, and
wherein the voltage divider is configured to vary the voltage portion based on the control signals received from the trip value controller such that a lesser proportion of the whole voltage drop is output by the voltage divider when the control signals from the trip value controller indicates that the trip value is set to be higher and vice versa.

28. The electronic fuse of claim 24, wherein the comparator is configured vary the threshold voltage based on the control signals received from the trip value controller such that the threshold voltage is increased when the control signals from the trip value controller indicates that the trip value is set to be higher and vice versa.

29. The electronic fuse of claim 28, further comprising a voltage divider configured to output a portion of the voltage drop across the shunt, the voltage portion being less than a whole voltage drop,
wherein the comparator is configured to measure the voltage portion output by the voltage divider, and
wherein the voltage divider is configured to vary the voltage portion based on the control signals received from the trip value controller such that a lesser proportion of the whole voltage drop is output by the voltage divider when the control signals from the trip value controller indicates that the trip value is set to be higher and vice versa.

* * * * *

UNITED STATES PATENT AND TRADEMARK OFFICE
CERTIFICATE OF CORRECTION

PATENT NO. : 8,050,005 B2
APPLICATION NO. : 11/950445
DATED : November 1, 2011
INVENTOR(S) : Lindqvist et al.

Page 1 of 1

It is certified that error appears in the above-identified patent and that said Letters Patent is hereby corrected as shown below:

On the Title Page, in Item (73), under "Assignee", in Column 1, Line 1,
delete "Telefonaktiebolaget LM Ericsson," and
insert -- Telefonaktiebolaget LM Ericsson (Publ), --, therefor.

Signed and Sealed this
Thirteenth Day of March, 2012

David J. Kappos
*Director of the United States Patent and Trademark Office*